N. CHAPDELAINE.

CHILD'S VEHICLE.

APPLICATION FILED MAR. 27, 1922.

Reissued July 11, 1922. 15,404.

INVENTOR

Norbert Chapdelaine

BY

Rogers, Kennedy & Campbell

ATT'YS.

UNITED STATES PATENT OFFICE.

NORBERT CHAPDELAINE, OF MONTREAL, QUEBEC, CANADA, ASSIGNOR, BY MESNE ASSIGNMENTS, TO INTERNATIONAL TOY COMPANY, LIMITED, OF MONTREAL, CANADA, A CORPORATION.

CHILD'S VEHICLE.

15,404. Specification of Reissued Letters Patent. Reissued July 11, 1922.

Original No. 1,335,425, dated March 30, 1920, Serial No. 303,233, filed June 10, 1919. Reissue No. 15,148, dated July 12, 1921, Serial No. 456,204, filed March 28, 1921. This application for reissue filed March 27, 1922. Serial No. 547,250.

*To all whom it may concern:*

Be it known that I, NORBERT CHAPDELAINE, a subject of the King of Great Britain, and a resident of the city of Montreal, in the Province of Quebec, in the Dominion of Canada, have invented a new and useful Child's Vehicle, of which the following is the specification.

The invention relates to a toy, as described in the present specification and illustrated in the accompanying drawings, that form part of the same.

The invention consists essentially of the novel mounting of a body portion on wheels, whereby the motion and consequent driving of the vehicle is accomplished preferably by the throw of an eccentric from a pivot point forming the axis of rotation in the swing of the body by the action of the eccentric.

The objects of the invention are to furnish amusement and healthful exercise to the young and at the same time occupy their minds and keep them alert by the necessity of constant driving; to accompany the driving action by a body movement intended to simulate the motion of a horse or other animal; and generally to provide a simple, cheap and useful toy for the amusement of children.

In the accompanying drawings.

Referring to the drawings wherein like and corresponding parts are designated by similar reference characters throughout the several views—

Figure 1:
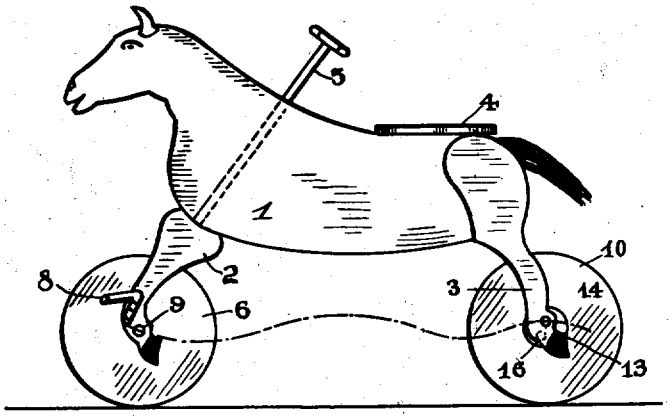
Figure 1 is a side elevation of the vehicle embodying the present invention.
Figure 2:
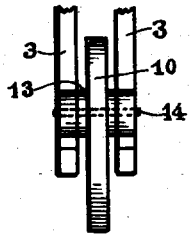
Fig. 2 is a detail rear end elevation of the same.

The body 1 forms the seat supporting member and is preferably made from a board or plate in the shape of a horse having frontwardly projecting legs 2 and rearwardly projecting legs 3, the ends of these legs being the extremities of the horse before and behind the body 1. A seat 4 is secured upon the body of the horse and extending through the body 1 is a suitable steering post 5 which is connected to the front legs 2, whereby they may be turned for guiding the vehicle over the ground. Journaled within the front legs 2 is a front wheel 6 which is preferably in disk form and secured to each front leg 2 is a foot rest or stirrup preferably made of angle iron as shown, and the tread portion 8 thereof is arranged above and slightly in advance of the axle 9 of this front wheel 6.

Figure 3:
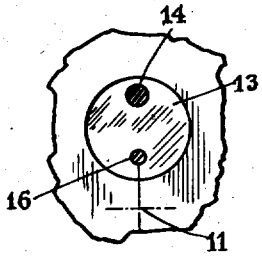
Fig. 3 is a detail view of the rear wheel.
Figure 4:
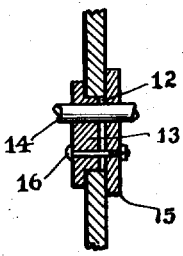
Fig. 4 is a detail section through the same.

The rear wheel 10 is preferably made in disk form and its center point is indicated by the numeral 11 in Fig. 3. This rear wheel or disk 10 is provided with an opening 12 therein which is arranged eccentric to the center point 11 of the wheel. Adapted to be seated within this opening 12 is a block 13 and extending through this block and arranged eccentrically therein is a shaft 14, which connects the wheel 10 with the rear legs 3.

A washer or plate 15 is connected to the block 13 through the bolt 16 whereby this block will be securely retained within the opening 12 and held against motion.

From the above description it will be seen that the parts 1, 2 and 3 constitute in effect, a single member upon which the rider is supported, and that said member serves as the sole connecting means between the front and rear wheels, and in connection with the rear wheel, said member acts in response to the shifting of the weight of the rider, as the sole means for propelling the vehicle.

The weighted body is the actuating member therefor. when the child mounts the first movement is to give the vehicle a slight start by propelling it with the feet in stepping contact with the ground in the same fashion as the old velocipede motion.

As soon as the start has been made the child relaxes at each turn of the rear wheel, so that his whole weight bears on the pivot point forward of the center thereby benefiting by the leverage similar to a pedal motion without using the feet. The child very soon becomes quite proficient and the art of driving is accompanied by a waving or galloping motion as indicated in the dotted line in Fig. 1. To increase or decrease the galloping motion of the horse the block 13 may be moved within the opening 12.

When the block 13 is in the position as shown in Fig. 3, the axle 14 is farther away from the center line 11, thereby giving a greater leverage and galloping motion to the toy, but by loosening the bolt 16 the block 13 may be revolved within the opening 12 thereby bringing the shaft 14 nearer the center 11 whereupon the bolt 16 is again tightened and by thus adjusting this block the galloping motion of the vehicle may be regulated as desired.

This vehicle naturally lends itself to many variations in size, shape and general features of construction. Such changes may readily be made without departing from the spirit of the invention so long as the essential feature remains that of leverage member operated by the weight above and swinging from a pivot point in the running gear at a fixed distance from preferably an eccentric.

What I claim is:—

1. In a child's vehicle, a body having legs extending frontwardly and rearwardly therefrom, a wheel journaled centrally in relation to its tread between the front legs and forming a pivot for said body and also a steering member, foot rests projecting from and rigid with said front legs, a rear wheel journaled eccentrically in relation to its tread between said rear legs and forming the propulsion member and a seat situated in a forward position in relation to said rear wheel.

2. In a child's vehicle, a board cut in the shape of a horse and having a seat secured on the hind quarters, a pair of hind legs rigidly fastened to the board and projecting therebehind and forming the rear extremities, a pair of front legs forming a fork and pivotally secured to the body by a steering post, foot rests secured to said front legs, a wheel front having a central pivot pin journaled in said fork at the extremities of the legs and forming a pivot member for the body, and a rear driving wheel having an eccentrically placed pin journaled in the rear legs at the extremities thereof and situated to the rear of said seat.

3. A child's vehicle comprising a body portion having the configuration of a horse, a pair of front legs and foot-rests thereon and pivotally connected thereto, a pair of rear legs rigid therewith, a wheel journaled within said front legs, a rear wheel, a block eccentrically connected within said rear wheel and rear shaft extending through said block and supporting said horse and situated at the rear extremity.

4. A child's vehicle of the character described comprising a body portion having the configuration of a horse, a seat mounted upon said body portion, a pair of legs pivotally connected to said body portion, a steering post connected to said legs, a wheel journaled within said legs, foot rests secured to said legs having the treadle portions thereof arranged above and in advance of the center of said wheel, a pair of rear legs rigidly secured to said body portion, a shaft journaled within said rear legs, a rear wheel, a block adjustably and eccentrically secured within said rear wheel, said rear shaft extending through said block and fast therewith.

5. In a child's vehicle, the combination of a member for supporting the rider, a front wheel rotatably mounted on said member and affording a support on which the member fulcrums at its front, said wheel being swiveled to steer the vehicle, and a rear rotatable propelling wheel on which said member is journaled on a single axial line eccentric to the wheel and said wheel operating by its rotation to cause the rear end of said member to move up and down on the front fulcrum as an axis; whereby the rider by shifting his weight to and fro may rotate the rear wheel and thereby propel the vehicle.

6. In a child's vehicle, the combination of a member for supporting the rider, a front wheel rotatably mounted at its center on said member and affording a support on which the member fulcrums at its front, said wheel being swiveled to steer the vehicle, and a rear rotatable propelling wheel on which said member is journaled on a single axial line eccentric to the wheel, and said wheel operating by its rotation to cause the rear end of said member to move up and down on the front fulcrum as an axis; whereby the rider by shifting his weight back and forth may rotate the rear wheel and thereby propel the vehicle.

7. In a child's vehicle, the combination of a member for seating the rider, a front wheel rotatably mounted on said member and affording a support on which the member fulcrums at its front, said wheel being swiveled to steer the vehicle, a rear rotatable propelling wheel on which said member is journaled on a single axial line eccentric to the wheel and said wheel operating by its rotation to cause the rear end of said member to move up and down on the front fulcrum as an axis, and foot rests on the member to enable the weight of the rider to be shifted back and forth and thereby rotate the rear wheel.

8. In a child's vehicle, the combination of a body for supporting the rider, said body comprising a main portion having a seat for the rider and a forward portion swiveled to the main portion and having a handle for turning it, a front wheel rotatably mounted at its center on the swiveled portion and affording a supporting axis on which the body as a whole fulcrums at its front, a rotatable propelling wheel journaled on the main portion of the body at its rear on a single eccentric axis and serving as a propelling means for the vehicle, and foot rests on the swiveled portion of the body to enable the weight of the rider to be shifted back and forth and thereby impart a turning motion to the rear wheel.

9. In a child's vehicle, a body having front and rear legs, a wheel journaled centrally in relation to its tread on the front leg, said front leg being movably mounted to serve as a steering member, and the axis of the front wheel forming a fulcrum for the body, foot rests fixed to the front leg, a rear wheel journaled eccentrically in relation to its tread on the rear leg and forming the propulsion member of the vehicle, and a rider's seat sustained by the body.

10. In a child's vehicle, the combination of a body to support the rider, said body comprising a main portion having a rider's seat, and a forward portion swiveled to the main portion and provided with a handle for turning it to steer the vehicle, a front wheel rotatably mounted at its center on the swiveled portion and affording a front fulcruming support on which the body as a whole may rock up and down, a rear supporting and propelling wheel rotatably mounted eccentrically on the main portion of the body, and foot rests on the swiveled portion of the body serving as a means for enabling the weight of the rider to be shifted alternately back and forth to rotate the rear wheel.

11. In a child's vehicle, the combination of a member for supporting the rider, a front wheel rotatably mounted on said member and affording a support on which the member fulcrums at its front, said wheel being swiveled to steer the vehicle, and a rear propelling wheel rotatably mounted on said member on a single axial line eccentric to the wheel, whereby by the rotation of the wheel, the member will be caused to rock up and down as a unit on the front fulcrum as an axis, the said member serving as the sole connection between the two wheels, and acting in connection with the rear wheel in response to the shifting of the weight of the rider, as the sole means for propelling the vehicle.

12. In a child's vehicle, the combination of a member for seating the rider, a front wheel rotatably mounted on said member and affording a support on which the member fulcrums at its front, and a rear rotatable propelling wheel on which said member is journaled on a single axial line eccentric to the wheel, said wheel operating by its rotation to cause the rear end of said member to move up and down on the front fulcrum as an axis; whereby the rider by shifting his weight to and fro may rotate the rear wheel and thereby propel the vehicle.

13. In a child's vehicle, the combination of a member for seating the rider, a front wheel rotatably mounted on said member and affording a support on which the member fulcrums at its front, a rear rotatable propelling wheel on which said member is journaled on a single axial line eccentric to the wheel, said rear wheel operating by its rotation to cause the rear end of said member to move up and down on the front fulcrum as an axis, and foot rests on the member to enable the weight of the rider to be shifted back and forth and thereby rotate the rear wheel.

In testimony whereof, I have affixed my signature hereto.

NORBERT CHAPDELAINE.